(12) United States Patent
Yoshioka et al.

(10) Patent No.: US 6,392,316 B1
(45) Date of Patent: May 21, 2002

(54) EMERGENCY INFORMING APPARATUS

(75) Inventors: Kenji Yoshioka; Arata Kurosawa, both of Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/531,552

(22) Filed: Mar. 20, 2000

(51) Int. Cl.[7] ............................. H02J 7/00; G08B 13/08
(52) U.S. Cl. ....................... 307/66; 307/10.02; 340/539; 340/636
(58) Field of Search .................. 307/66, 10.2; 340/426, 340/429, 528, 455, 531, 573, 636, 539

(56) References Cited

U.S. PATENT DOCUMENTS

| | | | | |
|---|---|---|---|---|
| 4,598,272 A | * | 7/1986 | Cox | 340/539 |
| 5,157,375 A | * | 10/1992 | Drori | 340/429 |
| 5,422,822 A | * | 6/1995 | Toyota et al. | 364/483 |
| 5,563,576 A | * | 10/1996 | Drori et al. | 340/455 |
| 5,744,963 A | * | 4/1998 | Arai et al. | 324/427 |
| 5,774,044 A | * | 6/1998 | Hayashi | 340/426 |

* cited by examiner

Primary Examiner—Rajnikant B. Patel
(74) Attorney, Agent, or Firm—Louis Woo (57) ABSTRACT

Battery test of a backup battery in an emergency informing apparatus is performed. The result of the battery test is displayed to display an amount of remaining energy, an error condition, an empty condition, a replacing timing of the backup battery. The result may be displayed by flickering an LED or an LCD. The event of the battery test is controlled with a timer to prevent a power consumption of the backup battery. That is, the battery test is effected when an engine is started after a predetermined interval has passed from the previous engine start. Moreover, a timer repeatedly generates a timing signal. If the timing signal is generated during a running condition of the engine, the battery test is performed. Moreover, at start-up of the engine if a predetermined interval has passed from the previous battery test, the present battery test is executed. The time interval data may be inputted to change the predetermined interval.

17 Claims, 11 Drawing Sheets

EMERGENCY INFORMING APPARATUS

BACKGROUND OF THE INVENTION

1. Field of the Invention

This invention relates to an emergency informing apparatus mounted on a vehicle for informing at least an emergency condition, position data, and identification data of the vehicle in response to a command signal.

2. Description of the Prior Art

An emergency informing apparatus mounted on a vehicle for informing at least an emergency condition, position data, and identification data of the vehicle in response to a command signal is known. Such a prior art emergency informing apparatus informs a police, etc. of at least emergency condition data, position data, and identification data of the vehicle in response to a switch.

SUMMARY OF THE INVENTION

The aim of the present invention is to provide a superior emergency informing apparatus.

According to this invention a first emergency informing apparatus for a vehicle is provided. The first emergency informing apparatus includes: a power supplying circuit including: a backup battery; and a voltage detection circuit for detecting a voltage of a battery of the vehicle. The power supplying circuit generates a supply power for the emergency informing apparatus from either of the battery of the vehicle or the backup battery in accordance with the detected voltage. The first emergency informing apparatus further includes a position detecting unit for detecting a position of the emergency informing apparatus in response to a command signal or a switch. The first emergency informing apparatus further includes a data generation circuit including a memory for generating emergency data including at least emergency condition data, identification data of the vehicle from the memory, called party data from the memory, and the position data in response to the command signal. The first emergency informing apparatus further includes a transmitting circuit for making a call with the called party data and transmitting emergency data to a called party indicated by the called party data in response to the command signal. The first emergency informing apparatus further includes a detecting circuit responsive to a detection command signal for detecting a condition of the backup battery. The first emergency informing apparatus further includes a display for displaying battery data in accordance with the detected condition.

In the first emergency informing apparatus, the detecting circuit detects an amount of remaining energy of the backup battery and the display displays the detected amount of remaining energy as the battery data.

The first emergency informing apparatus further includes a judging circuit for judging an error of the backup battery in accordance with the detected condition and judging a replacing timing of the backup battery in accordance with the detected condition. The display displays the battery data including data indicating the error and data indicating the replacing timing.

In the first emergency informing apparatus, the display flickers in accordance with the detected condition.

In the first emergency informing apparatus, the display flickers at a cycle determined in accordance with a value of the detected condition.

In this case, the display circuit includes a light emitting diode or a liquid crystal display.

The first emergency informing apparatus further includes a running condition detection circuit for detecting a running condition of an engine of the vehicle; a timer having a predetermined time interval value; and a detection command signal generation circuit for generating the detection command signal at a timing determined in accordance with the running condition detection circuit and the timer.

According to this invention, there is provided a second emergency informing apparatus. The second emergency informing apparatus for a vehicle includes: a power supplying circuit including: a backup battery; and a voltage detection circuit for detecting a voltage of a battery of the vehicle. The power supplying circuit generates a supply power for the emergency informing apparatus from either of the battery of the vehicle or the backup battery in accordance with the detected voltage. The second emergency informing apparatus further includes a position detecting unit for detecting a position of the emergency informing apparatus in response to a command signal. The second emergency informing apparatus further includes a data generation circuit including a memory for generating emergency data including at least identification data of the vehicle from the memory, called party data from the memory, and the position data in response to the command signal. The second emergency informing apparatus further includes a transmitting circuit for making a call with the called party data and transmitting emergency data to a called party indicated by the called party data in response to the command signal. The second emergency informing apparatus further includes a running condition detection circuit for detecting a running condition of an engine of the vehicle. The second emergency informing apparatus further includes a timing control circuit having a predetermined time interval value for generating a timing signal. The second emergency informing apparatus further includes a detecting circuit responsive to a detection command signal for detecting a condition of the backup battery and for outputting data of the detected condition. The detection command signal generation circuit generates the detection command signal at a timing determined in accordance with the running condition detection circuit and the timing signal.

In the second emergency informing apparatus, the running condition detection circuit includes a start-up detection circuit for detecting a start-up condition of the engine of the vehicle. The timing control circuit is responsive to the start-up detection circuit for measuring an interval between the previous start-up condition and the present start-up condition and comparing the interval with the predetermined time interval value. The detection command signal generation circuit generates the detection command signal in response to the timing control circuit and the start-up detection circuit when the interval exceeds the predetermined time interval value.

The second emergency informing apparatus further includes an inputting circuit for inputting the predetermined time interval to the timing control circuit.

In the second emergency informing apparatus, the timing control circuit periodically generates the timing signal at an interval corresponding to the predetermined time interval value. Moreover, the detection command signal generation circuit generates the detection command signal in response to the timing control circuit and the running condition detection circuit when the running condition detection circuit detects the running condition of the engine and the timing signal is generated.

In the second emergency informing apparatus, the running condition detection circuit includes a start-up detection circuit for detecting a start-up condition of the engine of the vehicle. The timing control circuit is responsive to the detection command signal generation circuit to measure an interval corresponding to the predetermined time interval value from the battery test. The detection command signal generation circuit generates the detection command signal in response to the timing signal and the start-up condition detection circuit when the start-up condition detection circuit detects the start-up condition of the engine after the interval has passed from the previous battery test.

BRIEF DESCRIPTION OF THE DRAWINGS

The object and features of the present invention will become more readily apparent from the following detailed description taken in connection with the accompanying drawings in which.

The same or corresponding elements or parts are designated with like references throughout the drawings.

DETAILED DESCRIPTION OF THE INVENTION

<First Embodiment>

Figure 1:
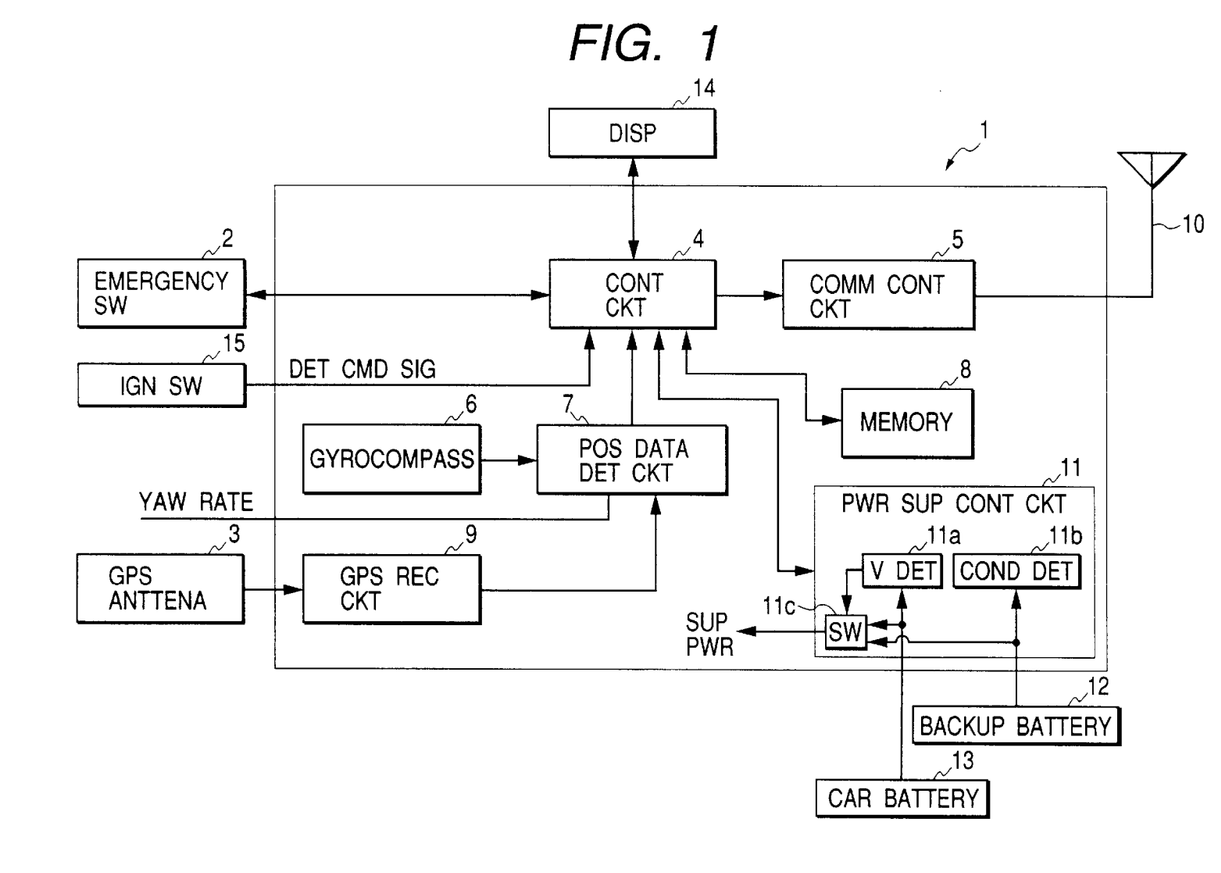
FIG. 1 is a block diagram of an emergency informing apparatus according to a first embodiment of this invention.

FIG. 1 is a block diagram of an emergency informing apparatus according to a first embodiment of this invention.

The emergency informing apparatus is mounted on a vehicle and connected to a car battery 13. The emergency informing apparatus 1 includes an emergency switch 2 for informing a predetermined station of an emergency condition, a GPS antenna 3 for receiving a GPS signal, a control circuit (microprocessor) 4 for executing controlling to respective circuits in the emergency informing apparatus, a communication control circuit 5 for controlling communication with a predetermined station such as a police through an antenna 10 via a base station (not shown) under controlling by the control circuit 4, a gyrocompass 6 for detecting a compass direction of the vehicle, a GPS receiver 9 for receiving the GPS signal to calculate its position, a position data detection circuit 7 for detecting position data from the GPS receiver 9 and the gyrocompass 6, a memory 8 for storing data indicating occurrence of emergency, a registered number of the vehicle (identification data of the vehicle), called party data such as a telephone number of police, and the name data of the owner of the vehicle, a backup battery 12 for supplying a power, a power supply control circuit 11 for controlling a supplying power to the emergency informing apparatus, and a display 14 for displaying battery data.

The emergency informing apparatus mounted on a vehicle is used for informing a request for a patrol car, an ambulance car, a fire engine truck on a motorcar accident, a sudden illness. When a motorcar accident or a sudden illness occurs, the driver depresses the emergency switch 2. In response to this, the emergency informing apparatus 1 automatically makes a call to a police or an emergency information center or the like and transmits data indicating occurrence of (kinds of) emergency, the present position of the vehicle, data of the registered vehicle in response to the emergency switch 2.

The control circuit 4 recognizes occurrence of emergency in response to the emergency switch 2. Then, the control circuit 4 supplies a position information demanding signal to the position data detecting circuit 7 and reads called party data, i.e., a telephone number of a police station, etc., identification data of this vehicle and the data of the owner of this vehicle from the memory 8. The control circuit 4 generates emergency data including data indicating occurrence of emergency, the present position data, and the identification data of this vehicle to supply the emergency data to the communication control circuit 5.

The communication control circuit 5 makes a call to the called party (to-be-called party) and when the called party responds the call, the communication control circuit 5 transmits the emergency data via the antenna 10 through a near base station to a wireless telephone network and through a public switched telephone network.

Moreover, the control circuit 4 detects the condition of the backup battery 12 in response to a detection command signal. The power supplying control circuit 11 includes a voltage detection circuit 11a for detecting a voltage of the car battery 13, a condition detection circuit 11b for detecting a condition of the backup battery 12, a switch 11c for receiving power from the car battery 13 (including a power from an alternator of the vehicle) when the voltage detection circuit 11a detects that a voltage of the car battery 13 is sufficient and receives power from the backup battery 12 when the voltage of the car battery 13 is insufficient. The condition detection circuit 11b detects a voltage of the backup battery 12 to detect the condition of the backup battery 12, for example, to judge the remaining energy in the backup battery 12. The remaining energy may be detected in other methods. For example, a constant load is connected to the terminals of the backup battery and the current flowing through the constant load is detected to detect the remaining energy.

The control circuit 4 operates the condition detection circuit 11b with a detection command signal to detect the condition of the backup battery 12 in response to the detection command signal generated by an ignition switch 15 when the engine is started. Moreover, the control circuit 4 operates the display 14 to display the condition of the backup battery 12. For example, the control circuit 4 and the display 14 displays, the amount of the remaining energy of the backup battery 12 or an error (an abnormal condition) in the backup battery 12, a replacing timing of the backup battery 12.

The control circuit 4 detects the start-up condition of the engine from the ignition key condition. However, it is also possible to detect the condition of the engine by detecting the voltage of the car battery which is charged by the alternator. The voltage of the car battery varies among the engine stop condition, the start-up condition, and the engine running condition. This can be detected by the control circuit 4 with the voltage detection circuit 11a and the memory 8.

The gyrocompass detects the compass direction of the vehicle. The GPS receiving circuit 9 receives the GPS signal to detect the present position of the vehicle. The position data detection circuit 7 receives the compass direction of the vehicle and the present position of the vehicle from the GPS receiving circuit 9. Moreover, the position data detection circuit 7 receives a yaw rate signal from the vehicle to detect a travelling direction. The position data supplies the position data including the present position, the compass direction, and the travelling direction to the control circuit 4.

Figure 2A:
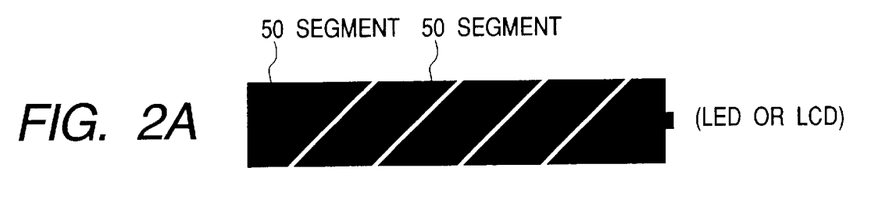
FIGS. 2A to 2E are schematic illustrations of the first embodiment showing conditions of the backup battery shown in FIG. 1.
Figure 2B:
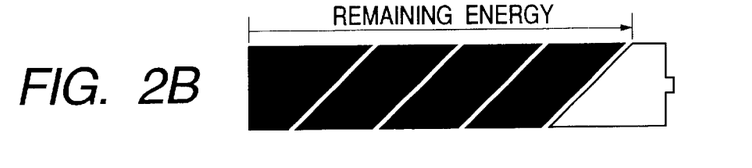
Figure 2C:
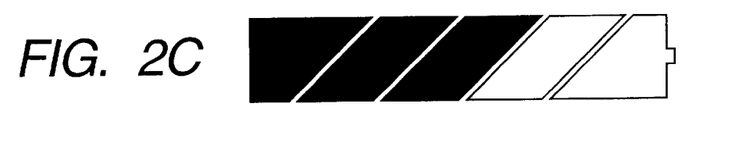
Figure 2D:
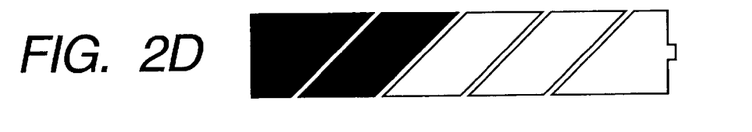
Figure 2E:
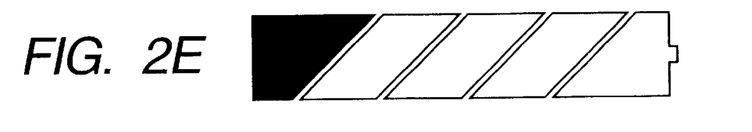

FIGS. 2A to 2E are schematic illustrations of the first embodiment showing the condition of the backup battery 12. The display condition shown in FIG. 2A shows a fully charged condition of the backup battery 12. The remaining energy gradually decreases from FIG. 2B to FIG. 2E. In the case of FIG. 2E, there is little remaining charge in the backup battery 12. The amount of the remaining energy is represented by the number of the segments 50 turned on. The display 14 comprises an LCD segment display or an LCD segment display.

<Second Embodiment>

The structure of the second embodiment is substantially the same as that of the first embodiment. The difference is that the control circuit 4 and the display 14 effect displaying operation by flickering.

Figure 3:
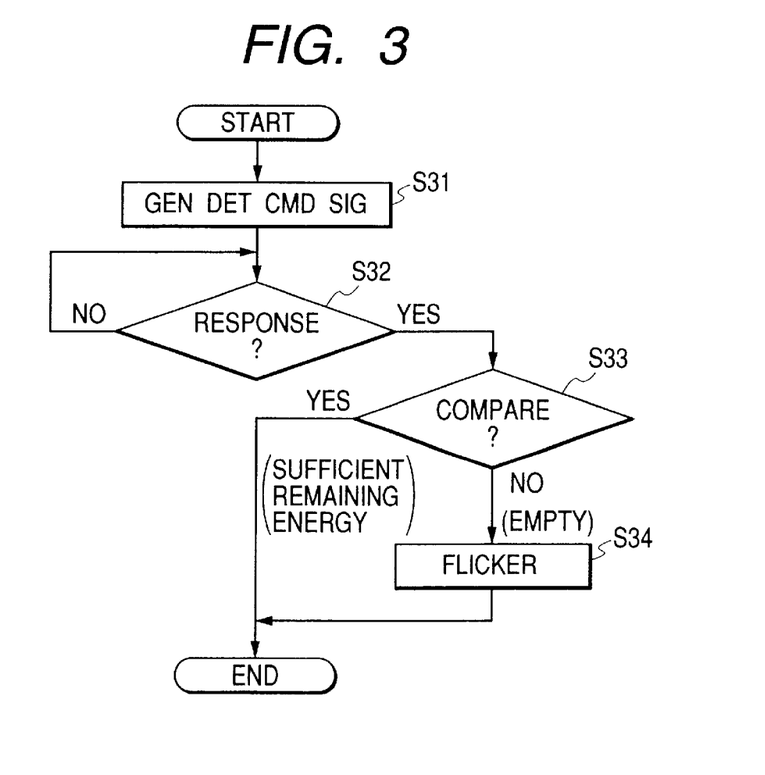
FIG. 3 depicts a flow chart of a second embodiment showing a display operation.
Figure 4:
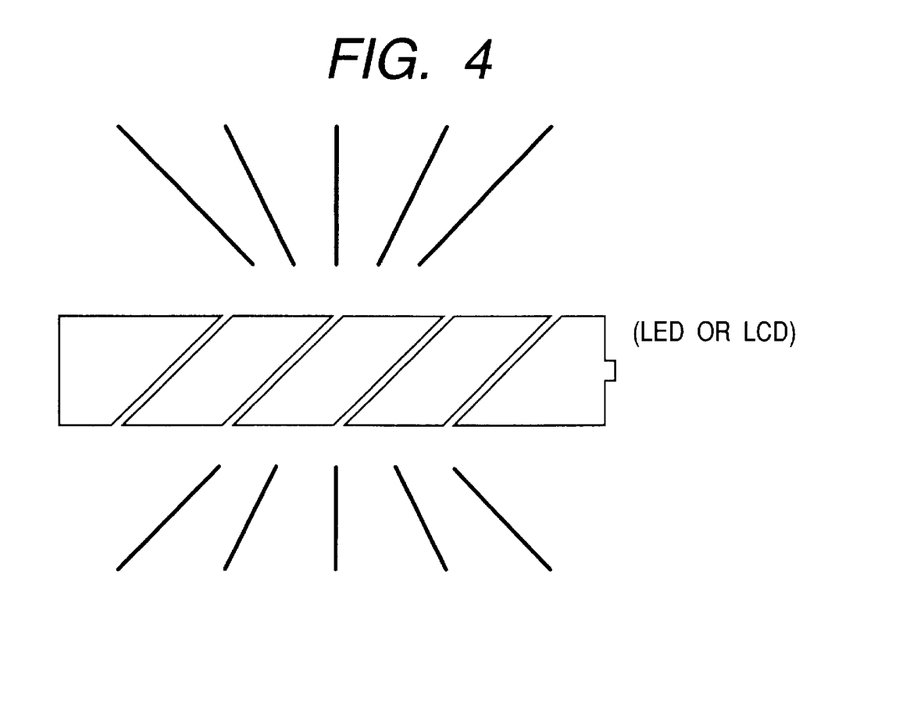
FIG. 4 is a schematic illustration of the second embodiment showing a condition of the backup battery.

FIG. 3 depicts a flow chart of a second embodiment showing displaying operation. FIG. 4 is a schematic illustration of the second embodiment showing a displaying condition for the backup battery 12.

The control circuit 4 supplies the detection command signal to the power supply control circuit 11 in step s31. The power supply control circuit 11 checks the condition of the backup battery 12 to detect the remaining energy in the backup battery 12 and supplies data indicating an amount of the remaining energy to the control circuit 4. The control circuit 4 waits the response from the power supply control circuit 11 and receives the data indicating the amount of the remaining energy in step s32. In the following step s33, the control circuit compares (analyzes) the amount of the remaining energy with a reference. If the amount of the remaining energy exceeds the reference, that is, there is sufficient or intermediate amount of remaining energy in the backup battery 12 for executing the emergency informing operation, processing ends. If the amount of the remaining energy does not exceed the reference, that is, there is no or almost no remaining energy (empty), processing proceeds to step s34. In step s34, the control circuit 4 operates the display 14 to flicker to inform the driver of the empty condition or an battery error condition of the backup battery 12. FIG. 4 shows the flickering condition of an LED (light emitting diode) segment display or a LCD (liquid crystal display) segment display.

<Third Embodiment>

The structure of the third embodiment is substantially the same as that of the second embodiment. The difference is that the control circuit 4 and the display 14 effect displaying operation by flickering at a cycle controlled in accordance with the result of the backup battery checking.

Figure 5:
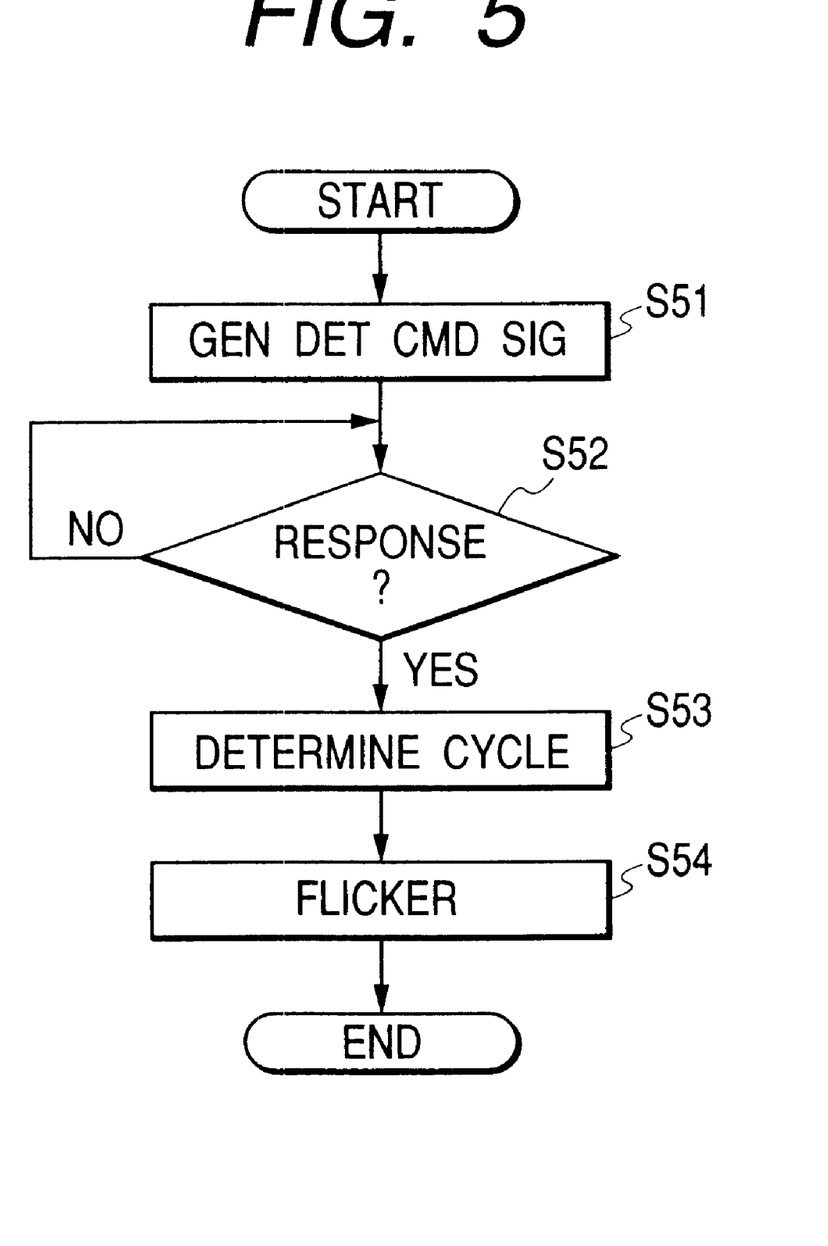
FIG. 5 depicts a flow chart of a third embodiment showing displaying operation.

FIG. 5 depicts a flow chart of a third embodiment showing displaying operation.

The control circuit 4 supplies the detection command signal to the power supply control circuit 11 in step s51. The power supply control circuit 11 checks the condition of the backup battery 12 to detect the remaining energy in the backup battery 12 and supplies data indicating an amount of the remaining energy to the control circuit 4. The control circuit 4 waits the response from the power supply control circuit 11 and receives the data indicating the amount of the remaining energy in step s52. In the following step s53, the control circuit 4 determines a cycle (a speed) of flickering the display 14 in accordance with the amount of the remaining energy. More specifically, the control circuit 4 and the display 14 flickers at a shorter cycle with decrease in the remaining energy. If the backup battery 12 is fully charged or have a full amount of energy, the display 14 flickers at a long cycle (at a low speed). In step s54, the control circuit 4 operates the display 14 to flicker the display 14 at the cycle determined in accordance with the amount of the remaining energy.

<Fourth Embodiment>

The structure of the fourth embodiment is substantially the same as that of the third embodiment. The difference is that the control circuit 4 and the display 14 further effect displaying operation to inform the driver of a replacing timing of the backup battery 12.

Figure 6:
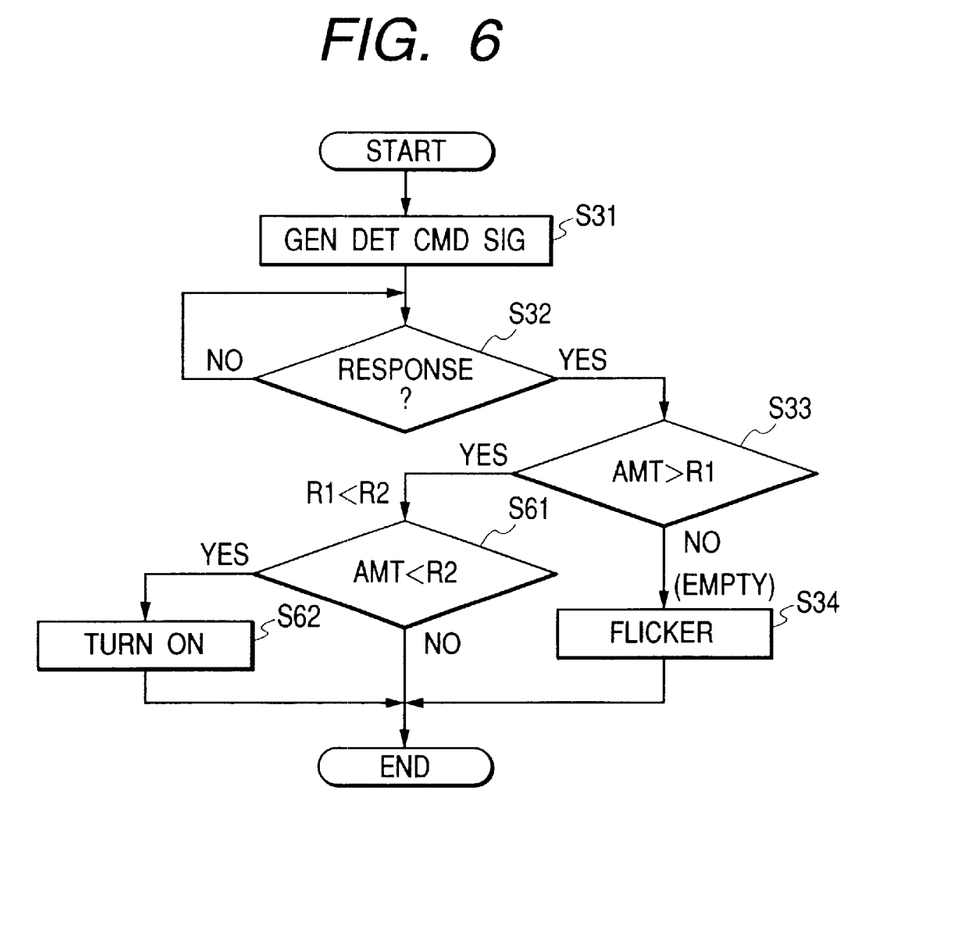
FIG. 6 depicts a flow chart of a fourth embodiment showing displaying operation.

FIG. 6 depicts a flow chart of the fourth embodiment showing a display operation wherein steps s61 and s62 are added to the flow chart shown in FIG. 3.

The control circuit 4 supplies the detection command signal to the power supply control circuit 11 in step s31. The power supply control circuit 11 checks the condition of the backup battery 12 to detect the remaining energy in the backup battery 12 and supplies data indicating an amount of the remaining energy to the control circuit 4. The control circuit 4 waits the response from the power supply control circuit 11 and receives the data indicating the amount of the remaining energy in step s32. In the following step s33, the control circuit 4 compares (analyzes) the amount of the remaining energy with a reference R1. If the amount of the remaining energy exceeds (greater than) the reference R1, processing proceeds step s61. If the amount of the remaining energy does not exceed the reference R1, that is, there is no or almost no remaining energy (empty), processing proceeds to step s34. In step s34, the control circuit 4 operates the display 14 to flicker the display 14 to inform the driver of the empty condition or a battery error condition of the backup battery 12.

In step s61, the control circuit 4 compares the amount of the remaining energy with a reference R2. If the amount of the remaining energy is smaller than the reference R2, the control circuit 4 operates the display 14 to inform the driver of the replacing timing of the backup battery with displaying which is different from that in step s34. For example, the display 14 turns on for several seconds for each segments shown in FIG. 2A successively and recurrently turn on. The reference R2 is determined such that there is no or almost no margin in the amount of the remaining energy in the backup battery 12. That is, R1<R2. Accordingly, it is informed that the emergency informing can be executed now but the remaining energy will become insufficient in the near future.

<Fifth Embodiment>

Figure 7:
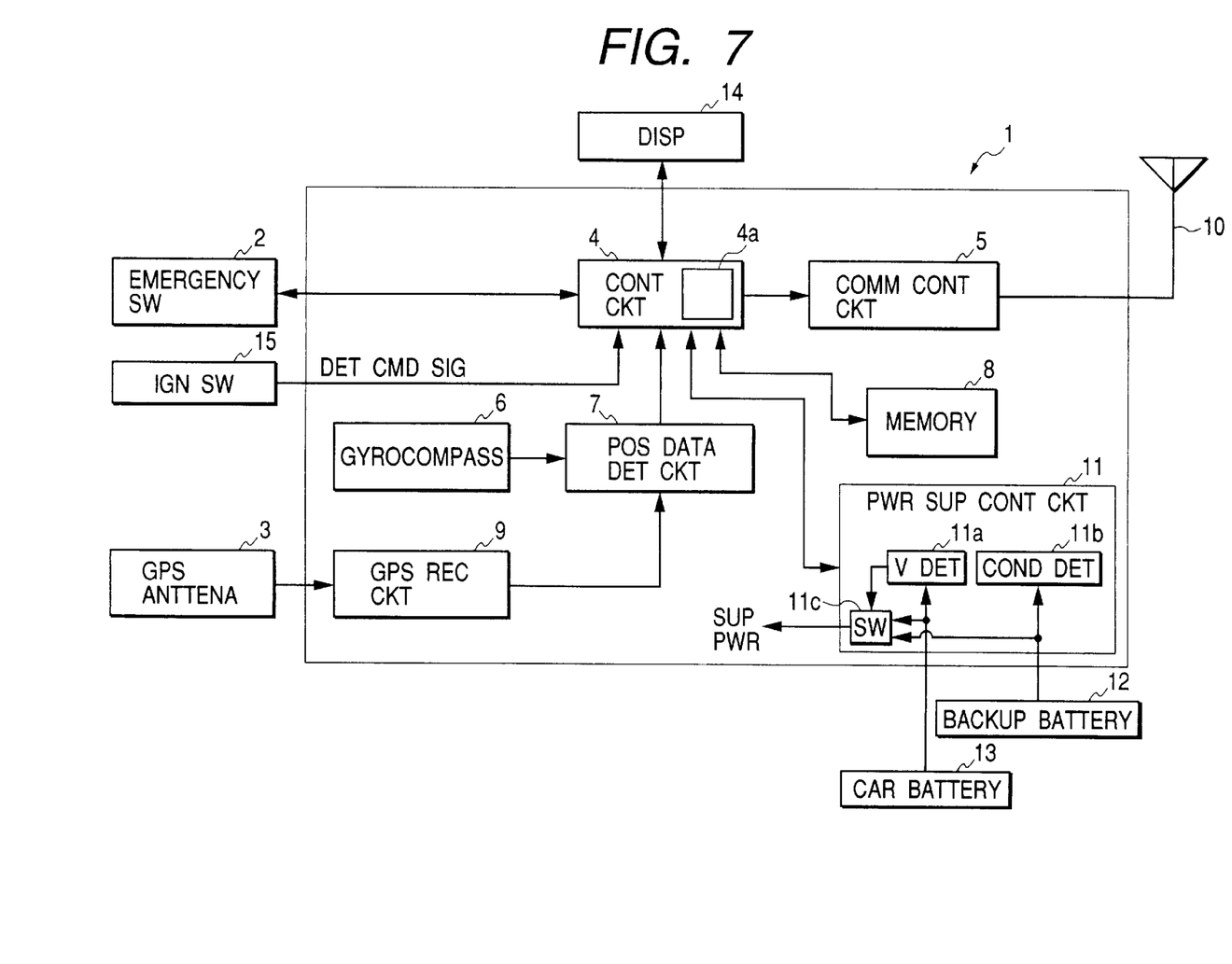
FIG. 7 is a block diagram of an emergency informing apparatus of a fifth embodiment.

FIG. 7 is a block diagram of an emergency informing apparatus of a fifth embodiment.

The structure of the fifth embodiment is substantially the same as that of the first embodiment. The difference is that the control circuit 4 includes a timer 4a and the control circuit 4 outputs the emergency data to supply the emergency data to the display 14 in response to the timer 4a in addition to the start-up condition or the running condition to reduce the battery testing rate.

The control circuit 4 checks the backup battery condition (backup battery test) and displays (outputs) the display data indicative of the battery condition in response to a detection command signal generated when the engine is started. Moreover, the control circuit 4 checks the backup battery 12 and displays (outputs) the display data in response to the detection command signal generated when the engine is started or running and the timer 4a indicates that a predetermined interval has passed.

If the condition detection circuit 11b detects that the condition of the backup battery 12 is in an empty condition, the control circuit 4 displays the display data with the display 14 to inform the driver of the empty condition of the backup battery 12 by flickering, etc.

Accordingly, the control circuit 4 executes checking the battery condition in accordance with the detected start-up condition or the running condition and the timer 4a, so that a power consumption of the backup battery 12 by the battery test is suppressed.

As mentioned earlier, the control circuit 4 detects the start-up condition and the running condition of the engine from the ignition key condition. Moreover, it is also possible to detect the condition of the engine by detecting the voltage of the car battery 13 which is charged by the alternator with the voltage detection circuit 11a. The voltage of the car battery 13 varies among the engine stop condition, the start-up condition, and the engine running condition. This can be detected by the control circuit 4 (microprocessor) with the voltage detection circuit 11a and the memory 8.

<Sixth Embodiment>

The structure of the sixth embodiment is substantially the same as that of the fifth embodiment. The difference is that a timer count in the timer 4a is cleared every detection of the start-up condition of the engine. That is, the battery test is performed if a predetermined interval has passed after the previous start-up condition.

Figure 8:
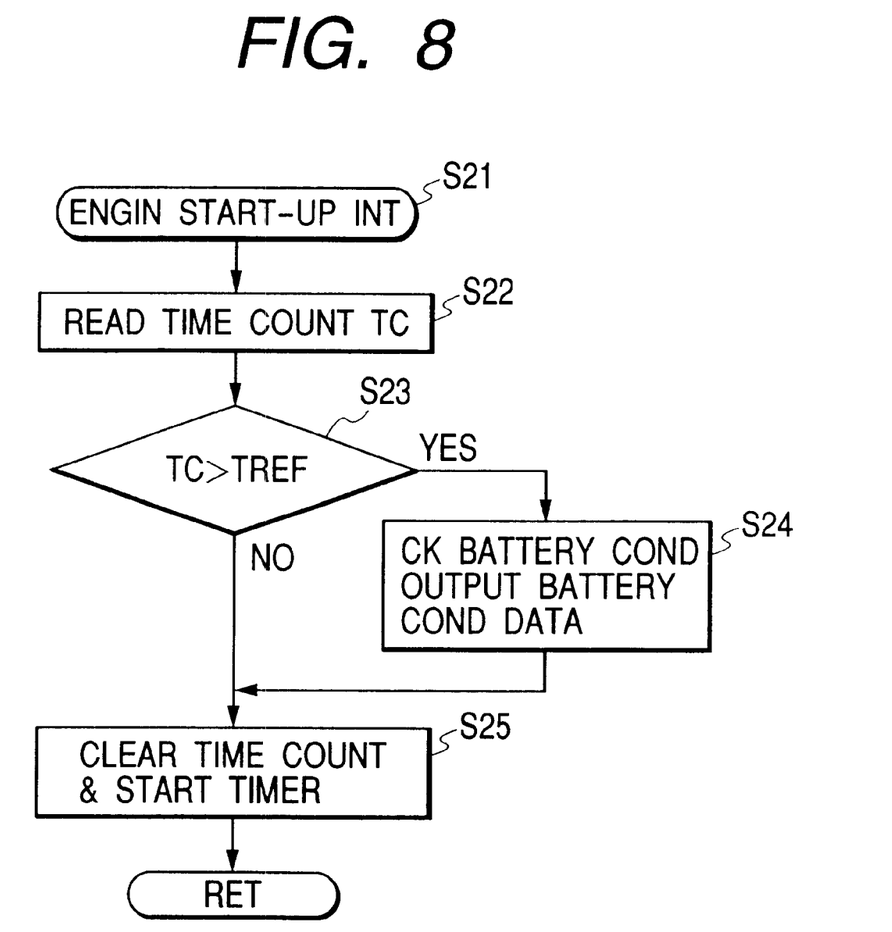
FIG. 8 depicts a flow chart of the sixth embodiment showing operation of the control circuit shown in FIG. 7.

FIG. 8 depicts a flow chart of the sixth embodiment showing operation of the control circuit 4.

In response to the start-up condition of the engine, the control circuit 4 executes an engine start-up interruption from the step s21 as shown in FIG. 8.

In the following step s22, the control circuit 4 reads a time count TC from the timer 4a. In step s23, the control circuit 4 compares the time count TC with a time count reference TREF. If the time count TC exceeds the time count reference TREF, the control circuit 4 supplies the detection command signal to the power supply control circuit 11 to check the battery condition of the backup battery 12 in step s24 and the control circuit 4 outputs the battery condition data. For example, if the checked battery condition indicates an empty condition of the backup battery 12, the control circuit 4 outputs data of the empty condition of the backup battery 12 in step s24. If the checked battery condition indicates that there is a sufficient remaining energy, the control circuit 4 outputs data indicating the sufficient remaining energy in step s24 to the display 14 or the other external circuits. Then, processing proceeds to step s25.

In step s23, if the time count Tc does not exceed the time count reference TREF, processing directly proceeds to step s25.

In step s25 after step s23 or the steps 24, the control circuit 4 clears the time count TC in the timer 4a and restarts the timer 4a again and processing returns to a main routine.

Accordingly, the control circuit 4 executes checking the battery condition when a predetermined time interval (TREF) has passed from the previous start-up condition of the engine, so that a power consumption of the backup battery 12 by the battery checking is suppressed.

<Seventh Embodiment>

Figure 9:
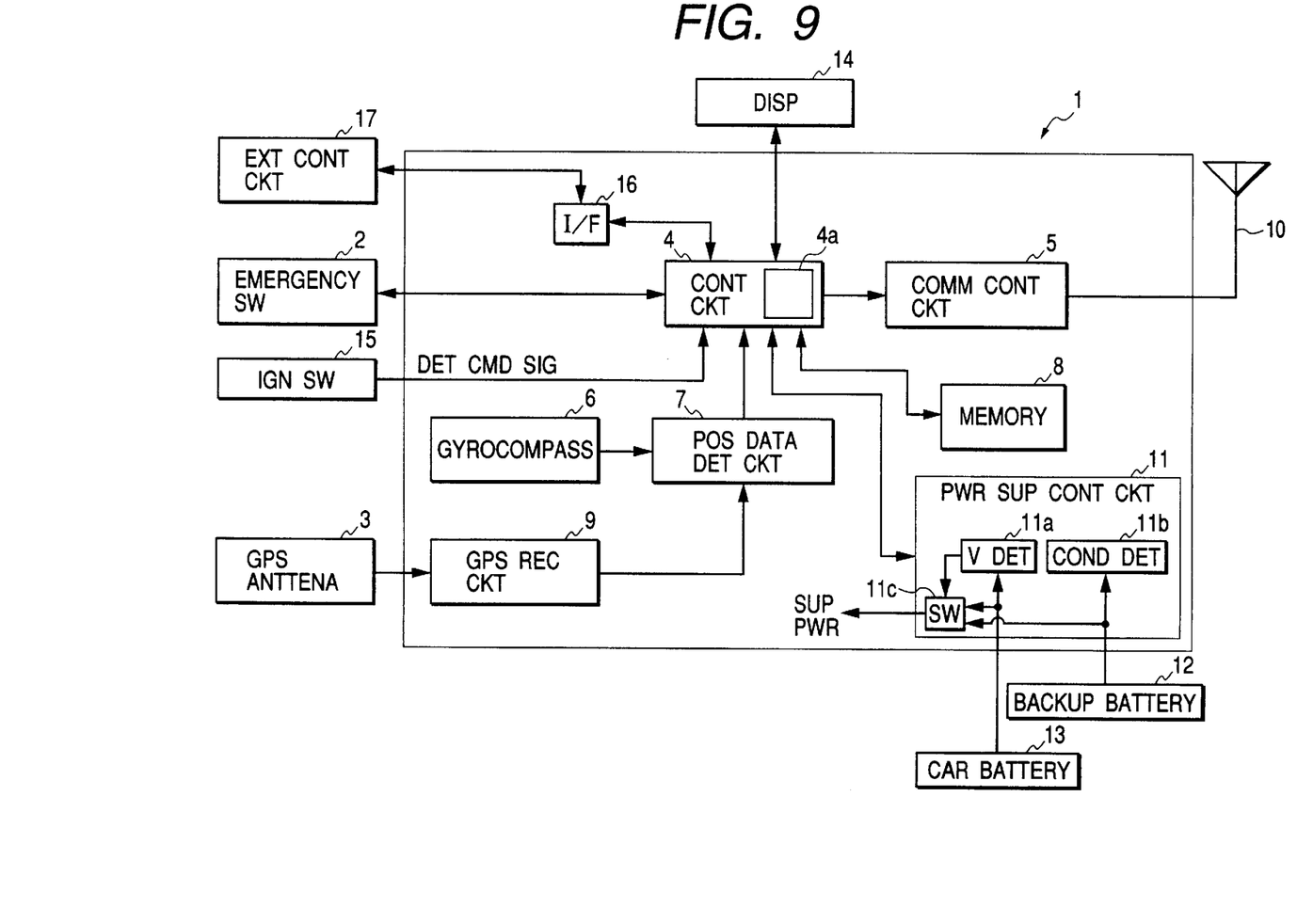
FIG. 9 is a block diagram of an emergency informing apparatus of a seventh embodiment.

FIG. 9 is a block diagram of an emergency informing apparatus of a seventh embodiment.

The structure of the seventh embodiment is substantially the same as that of the sixth embodiment. The difference is that an external control circuit 17 including an input circuit and an interface circuit 16 are further provided.

The external control circuit 17 inputs data for time count reference TREF to the control circuit 4 through an interface circuit 16. The control circuit 4 receives the data and stores the data as the time count reference TREF and executes the engine start-up interruption as described in the sixth embodiment with the inputted time count reference TREF. Accordingly, the cycle of checking the backup battery 12 can be externally controlled, so that a power consumption during the backup battery checking is further suppressed. The control circuit 4 supplies the battery condition data to the external control circuit 17 and to the display 14.

Figure 10:
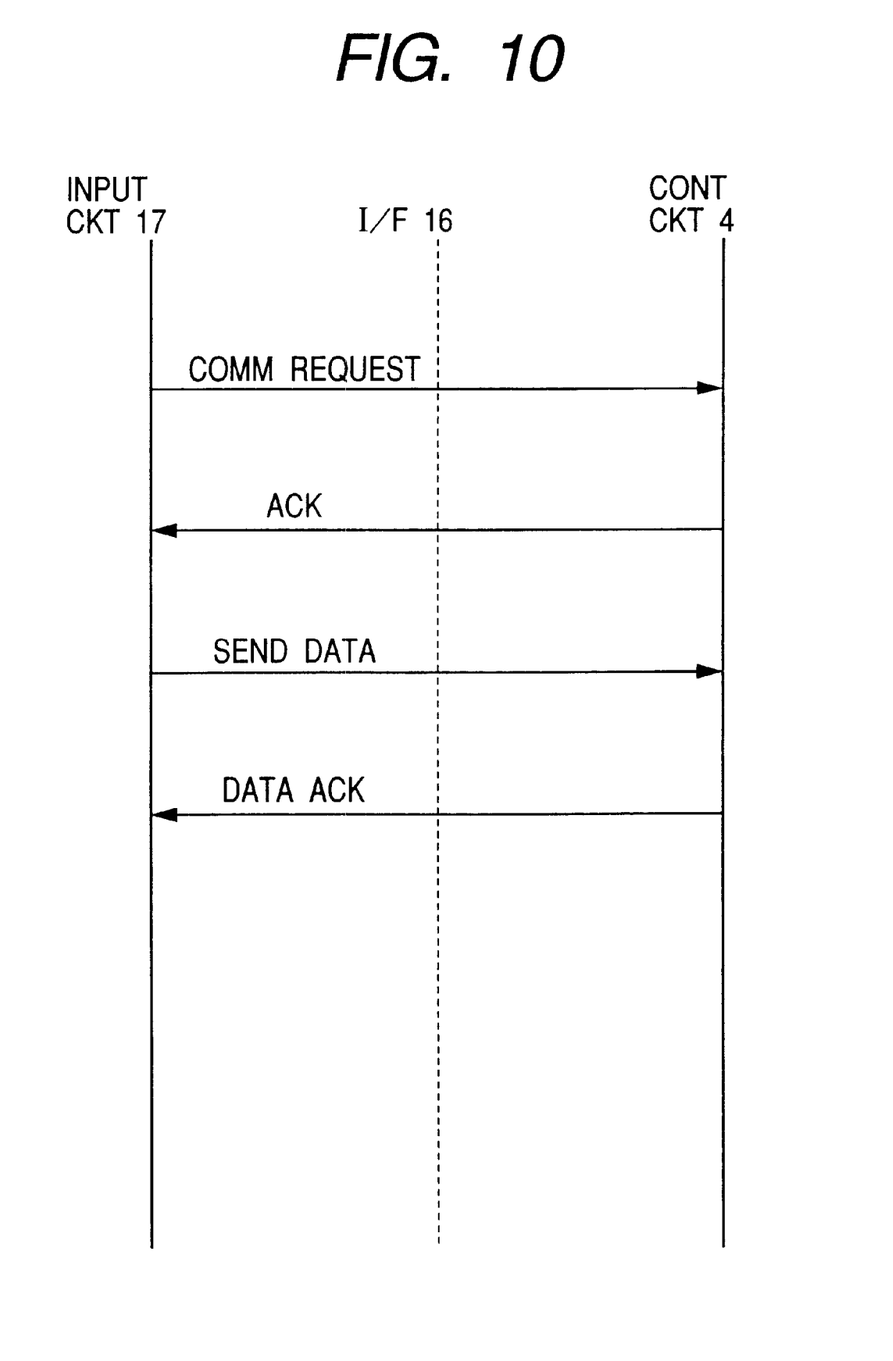
FIG. 10 depicts a sequence of communication between an external control circuit and the control circuit shown in FIG. 9, according to the seventh embodiment.

FIG. 10 depicts a sequence of communication between the external control circuit 17 and the control circuit 4 according to the seventh embodiment. The external circuit 17 communicates with the control circuit 4 through the interface circuit 16 with RS232C protocol.

The external circuit 17 receives the data to be set in the timer 4a in response to a manual operation by the driver. Then, the external circuit 17 transmits a communication request to the control circuit 4. In response to this, the control circuit 4 transmits an acknowledgment signal to the external control circuit 17. In response to this, the external control circuit 17 transmits the data to be set in the timer 4a to the control circuit 4. In response to this, the control circuit 4 receives the data and sets the data in the timer 4a and transmits a data acknowledgement signal to the input circuit 17.

<Eighth Embodiment>

The structure of an eighth embodiment is substantially the same as that of the fifth embodiment. The difference is that a timer interruption occurs during the running condition of the engine.

Figure 11:
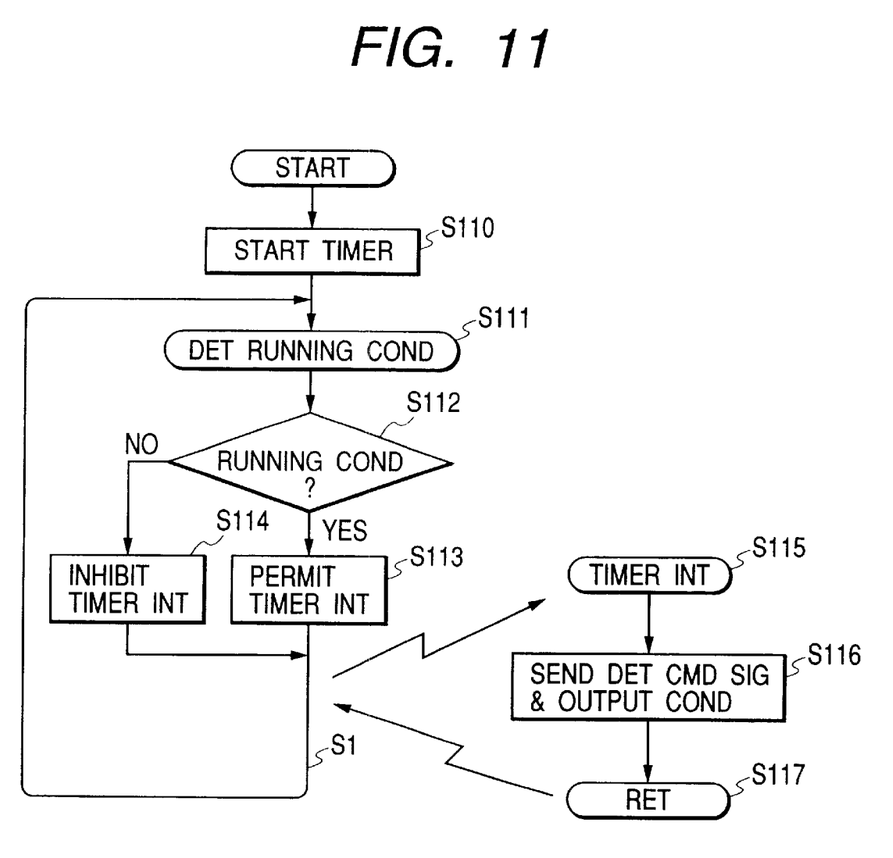
FIG. 11 depicts a flow chart of an eighth embodiment showing operation of the control circuit shown in FIG. 9.

FIG. 11 depicts a flow chart of the eighth embodiment showing operation of the control circuit 4.

In the main routine s1, the control circuit 4 starts the timer 4a in step s110. In the following step s111, the control circuit 4 detects the running condition of the engine. If the engine is in the running condition in step s112, the control circuit 4 permits the timer interruption in step s113. If the engine is not in the running condition in step s112, the control circuit 4 inhibits the timer interruption in step s114. After steps s113 and s114 processing returns to step s111.

When the timer interruption occurs, in the timer interruption S115, the control circuit 4 sends the detection command signal to the power supply control circuit 11 to check the condition of the backup battery 12 and outputs the received checking result of the battery condition of the backup battery 12. For example, if the data of the condition of the backup battery 12 received from the power supply control circuit 11 indicates an empty condition, the control circuit 4 informs the driver of the empty condition. Moreover, the control circuit 4 transmits the received checking result of the battery condition of the backup battery 12 to the external control circuit 17. After step s116, processing returns to the main routine s1.

More specifically, the timer 4a repeatedly generates a timing signal at a predetermined interval. If the timing signal is generated during the running condition of the engine, the backup battery 12 is tested and the result is outputted.

Accordingly, a power consumption of the backup battery 12 by the battery checking is suppressed using the timer 4a.

In the eighth embodiment, as described in the seventh embodiment, the external control circuit 17 may input the data of the predetermined time interval to the timer 4a to change the predetermined time interval.

<Ninth Embodiment>

The structure of a ninth embodiment is substantially the same as that of the fifth embodiment. The difference is that the battery test (detecting the condition of the backup battery 12) is effected after a predetermined interval has passed from the previous battery test.

Figure 12:
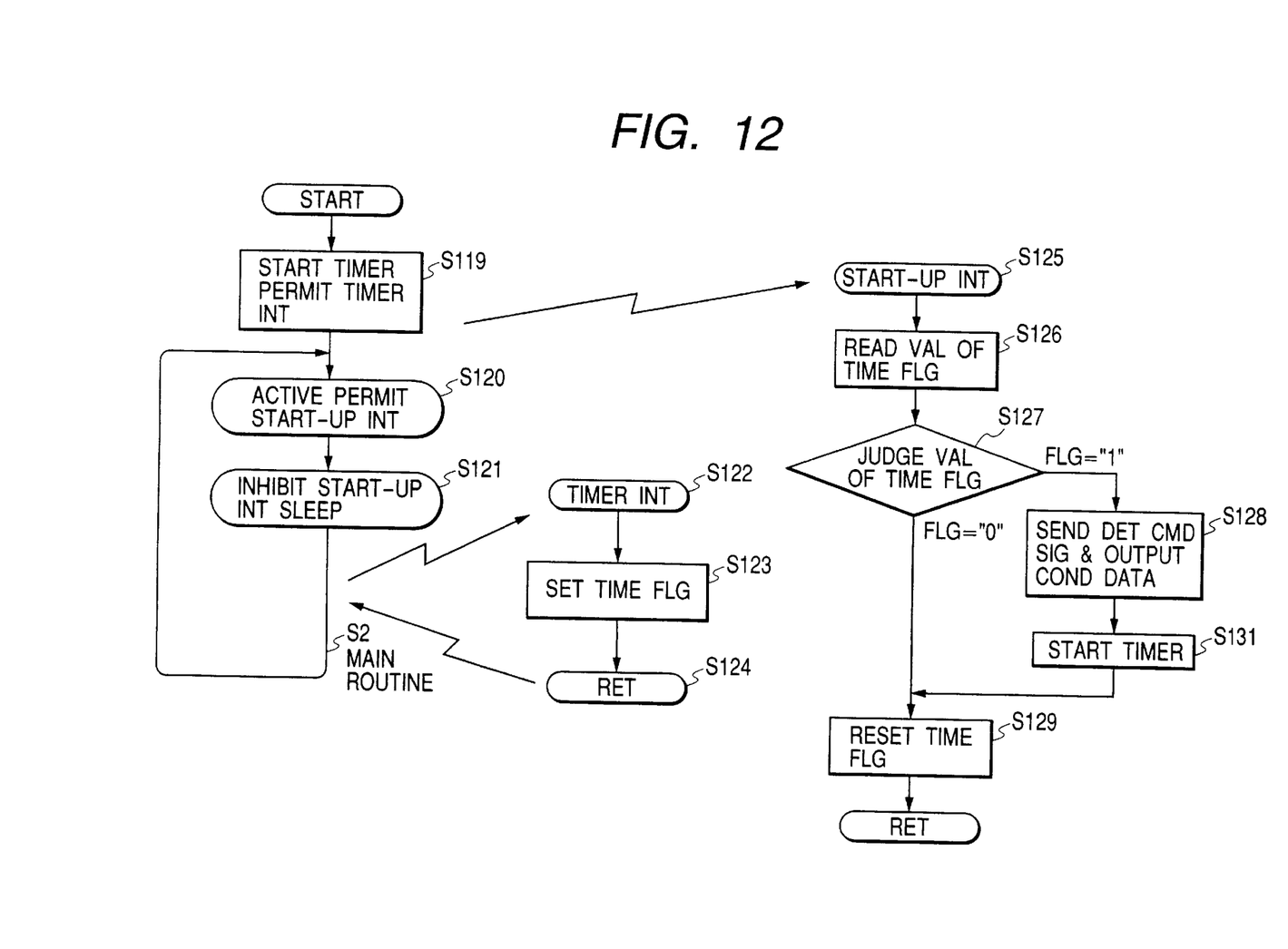
FIG. 12 depicts a flow chart of the ninth embodiment showing operation of the control circuit shown in FIG. 9.

FIG. 12 depicts a flow chart of the ninth embodiment showing operation of the control circuit 4.

In a main routine s2, the control circuit 4 starts the timer 4a and permits the timer interruption in step s119. In the following step s120, that is, when the control circuit 4 is activated (the ignition key is turned on), the control circuit 4 permits a start-up interruption. When the ignition key 15 is turned off and the engine is stopped, the control circuit (microprocessor) 4 inhibits the start-up interruption and enters a sleep condition.

During the active condition and the sleep condition, the timer 4a (counter) operates and generates a timing signal indicating a predetermined interval has passed to enter the timer interruption s122.

In the timer interruption s122, the control circuit 4 sets a time flag in step s123 in the active and sleep conditions and returns to the main routine s2.

In the start-up interruption s125, the control circuit 4 (in the active condition) reads the value of a time flag in step S126. In the following step s126, the control circuit 4 judges whether the value of the time flag is "1". If the value of the time flag is "1" in step s127, processing proceeds to step S128. In step s128, the control circuit 4 sends the detection command signal to the power supply control circuit 11. If the received battery condition indicates an empty condition, the control circuit 4 outputs or displays the battery condition on the display 14. In the following step s131, the control circuit 4 sets and re-starts the timer 4a and resets the time flag in step s129 and processing returns to the main routing s1.

If the value of the time flag is "0" in step s127, processing proceeds to step S129. In step s129, the control circuit 4 resets the time flag and processing returns to the main routine s2.

At the first processing of the control circuit 4, the timer 4a is automatically started in step s119.

After a predetermined interval has passed, the timer 4a sets the time flag in step 123. and then, the battery test is executed in the start-up interruption in step s128.

After second processing in the start-up interruption s125, the battery test in step s128 is executed after the predetermined time interval has passed from the previous battery test by checking the time flag.

If the start-up interruption is executed before the predetermined time interval has passed, processing in the start-up interruption s125 proceeds from the step s127 to s129, so that the battery test is not executed.

Accordingly, the control circuit 4 executes checking the battery condition when a predetermined time interval (TREF) has passed from the previous battery check during the start-up or running condition of the engine, so that a power consumption of the backup battery 12 by the battery checking is suppressed.

In the ninth embodiment, as described in the seventh embodiment, the external control circuit 17 may input the data of the predetermined interval to the timer 4a to change the predetermined interval set in the timer 4a. Moreover, the control circuit 4 outputs the condition data of the back-up battery 12 to the external circuit 17.

As mentioned, the battery test of the backup battery 12 in an emergency informing apparatus is performed. The result of the battery test is displayed to display an amount of remaining energy, an error condition, an empty condition, a replacing timing of the backup battery. The result may be displayed by flickering an LED or an LCD. The event of the battery test is controlled with a timer to prevent a power consumption of the backup battery. That is, the battery test is effected when an engine is stared after a predetermined interval has passed from the previous engine start. Moreover, the timer 4a may repeatedly generate the timing signal. If the timing signal is generated during a running condition of the engine, the battery test is performed. Moreover, at start-up of the engine if a predetermined interval has passed from the previous battery test, the present battery test may be executed. The time interval data may be inputted to change the predetermined interval.

What is claimed is:

1. An emergency informing apparatus for a vehicle comprising:

power supplying means including:
    a backup battery; and
    voltage detection means for detecting a voltage of a battery of said vehicle, said power supplying means generating a supply power for said emergency informing apparatus from either of said battery of said vehicle or said backup battery in accordance with said detected voltage;

position detecting means for detecting a position of said emergency informing apparatus in response to a command signal;

data generation means including storing means for generating emergency data including at least identification data of said vehicle from said storing means, called party data from said storing means, and said position data in response to said command signal;

transmitting means for making a call with said called party data and transmitting emergency data to a called party indicated by said called party data in response to said command signal;

detecting means responsive to a detection command signal for detecting a condition of said backup battery; and display means for displaying battery data in accordance with said detected condition.

2. An emergency informing apparatus as claimed in claim 1, wherein said detecting means detects an amount of remaining energy of said backup battery and said display means displays said detected amount of remaining energy as said battery data.

3. An emergency informing apparatus as claimed in claim 1, further comprising judging means for judging an error of said backup battery in accordance with said detected condition and judging a replacing timing of said backup battery in accordance with said detected condition, wherein said display means displays said battery data including data indicating said error and data indicating said replacing timing.

4. An emergency informing apparatus as claimed in claim 1, wherein said display means flickers in accordance with said detected condition.

5. An emergency informing apparatus as claimed in claim 1, wherein said display means flickers at a cycle determined in accordance with a value of said detected condition.

6. An emergency informing apparatus as claimed in claim 4, wherein said display means comprises a light emitting diode.

7. An emergency informing apparatus as claimed in claim 4, wherein said display means comprises a liquid crystal display.

8. An emergency informing apparatus as claimed in claim 5, wherein said display means comprises a light emitting diode.

9. An emergency informing apparatus as claimed in claim 5, wherein said display means comprises a liquid crystal display.

10. An emergency informing apparatus as claimed in claim 1, further comprising:

running condition detection means for detecting a running condition of an engine of said vehicle;

timer means having a predetermined time interval value; and detection command signal generation means for generating said detection command signal at a timing determined in accordance with said running condition detection means and said timer means.

11. An emergency informing apparatus for a vehicle comprising:

power supplying means including:
a backup battery; and
voltage detection means for detecting a voltage of a battery of said vehicle, said power supplying means generating a supply power for said emergency informing apparatus from either of said battery of said vehicle or said backup battery in accordance with said detected voltage;

position detecting means for detecting a position of said emergency informing apparatus in response to a command signal;

data generation means including storing means for generating emergency data including at least identification data of said vehicle from said storing means, called party data from said storing means, and said position data in response to said command signal;

transmitting means for making a call with said called party data and transmitting emergency data to a called party indicated by said called party data in response to said command signal;

running condition detection means for detecting a running condition of an engine of said vehicle;

timing control means having a predetermined time interval value for generating a timing signal; and detecting means responsive to a detection command signal for detecting a condition of said backup battery and outputting data of said detected condition, said detection command signal generation means generating said detection command signal at a timing determined in accordance with said running condition detection means and said timing signal.

12. An emergency informing apparatus as claimed in claim 11, wherein said running condition detection means comprises start-up detection means for detecting a start-up condition of said engine of said vehicle, said timing control means is responsive to said start-up detection means for measuring an interval between the previous start-up condition and the present start-up condition and comparing said interval with said predetermined time interval value, and said detection command signal generation means generates said detection command signal in response to said timing control means and said start-up detection means when said interval exceeds said predetermined time interval value.

13. An emergency informing apparatus as claimed in claim 12, further comprising inputting means for inputting said predetermined time interval to said timing control means.

14. An emergency informing apparatus as claimed in claim 11, wherein said timing control means periodically generates said timing signal at an interval corresponding to said predetermined time interval value and said detection command signal generation means generates said detection command signal in response to said timing control means and said running condition detection means when said running condition detection means detects said running condition of said engine and said timing signal is generated.

15. An emergency informing apparatus as claimed in claim 14, further comprising inputting means for inputting said predetermined time interval value to said timing control means.

16. An emergency informing apparatus as claimed in claim 11, wherein said running condition detection means comprises start-up detection means for detecting a start-up condition of said engine of said vehicle, said timing control means is responsive to said detection command signal generation means for measuring an interval corresponding to said predetermined time interval value from when said condition of said backup battery is previously detected, and said detection command signal generation means generates said detection command signal in response to said timing signal and said start-up condition detection means when said start-up condition detection means detects said start-up condition of said engine after said interval has passed from when said condition of said backup battery is previously detected.

17. An emergency informing apparatus as claimed in claim 16, further comprising inputting means for inputting time data corresponding to said predetermined time interval value to said timing control means.

* * * * *